United States Patent
Kan et al.

[11] Patent Number: 5,214,553
[45] Date of Patent: May 25, 1993

[54] MAGNETIC CONTACT RECORDING HEAD FOR OPERATION WITH TAPES OF VARYING THICKNESSES

[75] Inventors: Kenneth Y. Kan, Lexington; George Saliba, Northboro; Robert A. Nute, Westboro, all of Mass.

[73] Assignee: Digital Equipment Corporation, Maynard, Mass.

[21] Appl. No.: 693,449

[22] Filed: Apr. 29, 1991

[51] Int. Cl.⁵ .................. G11B 5/187; G11B 5/29
[52] U.S. Cl. .................. 360/122; 360/121; 360/125
[58] Field of Search .................. 360/119-126

[56] References Cited

U.S. PATENT DOCUMENTS

| | | | |
|---|---|---|---|
| 2,496,441 | 2/1950 | Camras | 360/125 |
| 3,414,895 | 12/1968 | Allen | 360/128 |
| 3,829,895 | 8/1974 | Tanaka et al. | 360/121 |
| 4,347,538 | 8/1982 | Klank | 360/137 |
| 4,589,043 | 5/1986 | Grundtner | 360/122 |
| 4,652,955 | 3/1987 | Niwa et al. | 360/122 |
| 4,797,767 | 1/1989 | Baus, Jr. | 360/122 |
| 4,809,110 | 2/1989 | Hertrich | 360/122 |
| 4,894,736 | 1/1990 | Orton | 360/122 |
| 4,967,301 | 10/1990 | Lopez et al. | 360/128 |
| 5,063,469 | 11/1991 | Tandai | 360/122 |

FOREIGN PATENT DOCUMENTS

| | | | |
|---|---|---|---|
| 0356031 | 7/1989 | European Pat. Off. | |
| 57-176521 | 10/1982 | Japan | |
| 58-130422 | 10/1983 | Japan | |
| 61-8709 | 1/1986 | Japan | 360/122 |
| 61-80608 | 4/1986 | Japan | 360/122 |
| 2-236807 | 9/1990 | Japan | 360/122 |
| WO8906425 | 12/1987 | PCT Int'l Appl. | |

OTHER PUBLICATIONS

Article entitled "Experiment on Tape-To-Head Contact of Stationary Head Multi-Track Record", by H. Okada et al., from Sharp Technical Journal, No. 38, 1987, at pp. 36-40.

Primary Examiner—Stuart S. Levy
Assistant Examiner—Jefferson Evans
Attorney, Agent, or Firm—Cesari and McKenna

[57] ABSTRACT

A contact recording head assembly arrangement capable of performing reliable read and write operations on magnetic tapes of varying thickness is provided. The head assembly includes a read island and a write island with gaps offset a distance from their centers to maintain signal integrity when processing the data signals stored and retrieved from the various tapes.

7 Claims, 7 Drawing Sheets

MAGNETIC CONTACT RECORDING HEAD FOR OPERATION WITH TAPES OF VARYING THICKNESSES

FIELD OF THE INVENTION

This invention relates generally to magnetic storage devices and more specifically to a contact head assembly for recording and retrieving data from magnetic tapes of varying thicknesses.

BACKGROUND OF THE INVENTION

A magnetic head assembly including separate read and write head elements or islands is the recording and reproducing unit of a magnetic tape drive system. An island may include one or more magnetic cores. A magnetic coil is wound around the magnetic core of each read and write island, and each core has a gap. During the recording process, electric current supplied to a coil produces a magnetic field in the write core. The resulting flux across the gap region enters a magnetic tape moving over the island and magnetizes a small area therein in accordance with the direction of the current. During the reproducing process, the magnetized areas induce magnetic flux in the read core and an associated voltage in the coil.

The bit density is a measure of the number of magnetized flux reversals recorded per unit length or area on a magnetic tape. High bit density is desired for the tape in order to provide high data capacity. At high bit recording densities, the separation between the gap of an island and the moving tape must be maintained within very narrow tolerances, e.g. less than 2 microinches, to achieve proper retrieval and recording of the closely-spaced bits; slight variations in the separation between the gap and tape can lead to erratic recording performance. Yet for low-to-moderate bit densities, a larger separation, e.g. 10-20 microinches, is tolerable because the bits are spaced farther apart.

Previously, magnetic tapes having a thickness of at least 1.0 mil (0.001 inch) were widely used in tape drives. These tapes are composed of materials having microstructural properties that result in scratching of the outer surfaces of the islands and eventual wear of the head assembly. Advances in recording material technology have led to thinner tapes having a thickness of 0.5 mil (0.0005 inch) or less and capable of achieving high bit densities. The thin tapes have largely replaced the thicker tapes because they provide higher storage capability per volume of tape. Moreover, the materials of the thinner tapes are smoother, thus increasing the operating life of the head. Yet, there is still a need to read the thicker tapes, since they often contain data that must be retrieved from them.

A magnetic head assembly configured to operate with tapes of different thicknesses may encounter data reliability problems. Movement of a tape over the head assembly gradually wears the contour of the head to the "natural radius of curvature" of the tape. The inherent stiffness of a tape influences its natural curvature, i.e. thick tapes are typically stiffer than thin tapes and thus, have a larger natural radius at constant tension. A head assembly partially shaped to the curvature of a thick tape has a large tape-to-head separation at the center of the island, where the gap is located, when operating with thinner tapes. The thick tape is also likely to scratch the surface of the head, particularly in the area of the gap. The increased separation and scratches significantly reduce the amplitude of signals retrieved from the thin tape.

Therefore, an object of the present invention is to provide a magnetic contact head assembly capable of recording and retrieving data on magnetic tapes of different thicknesses.

Another object of the present invention is to minimize the separation between the gap of an island and a thin magnetic tape having a high bit density so as to facilitate proper recording and retrieval performance.

Additionally, an object of the present invention is to provide controlled separation between the gap of an island and a thick magnetic tape having a low bit density so as to minimize damage to the gap, yet still maintain proper recording performance.

SUMMARY OF THE INVENTION

In general, the arrangement provides a contact recording head assembly capable of performing reliable read and write operations on magnetic tapes of varying thicknesses. The head assembly includes a read island flanked by write islands with the gaps of the islands offset from the centers of the islands to maintain signal integrity when recording and reproducing data signals from the various tapes.

More specifically, the recording head assembly has a generally arcuate outer surface over which the tapes pass. The read and write islands are integral with the head assembly and project above the head assembly's outer surface. The islands have generally arcuate top surfaces that are spaced from the head assembly outer surface and that peak at the geometric centers of their top surfaces. The radius of curvature of each of these islands is initially equal to the natural radius of the thin tape at the operating tension of the tape drive.

Each island includes a magnetic coil wound around a magnetic core with a gap. The gap is offset from the center of the island to a location that maintains "contact" between the gap and a high density, thin tape, yet maintains a separation between the gap and a low density, thick tape. As described below, this provides effective operation with both thin and thick tapes.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
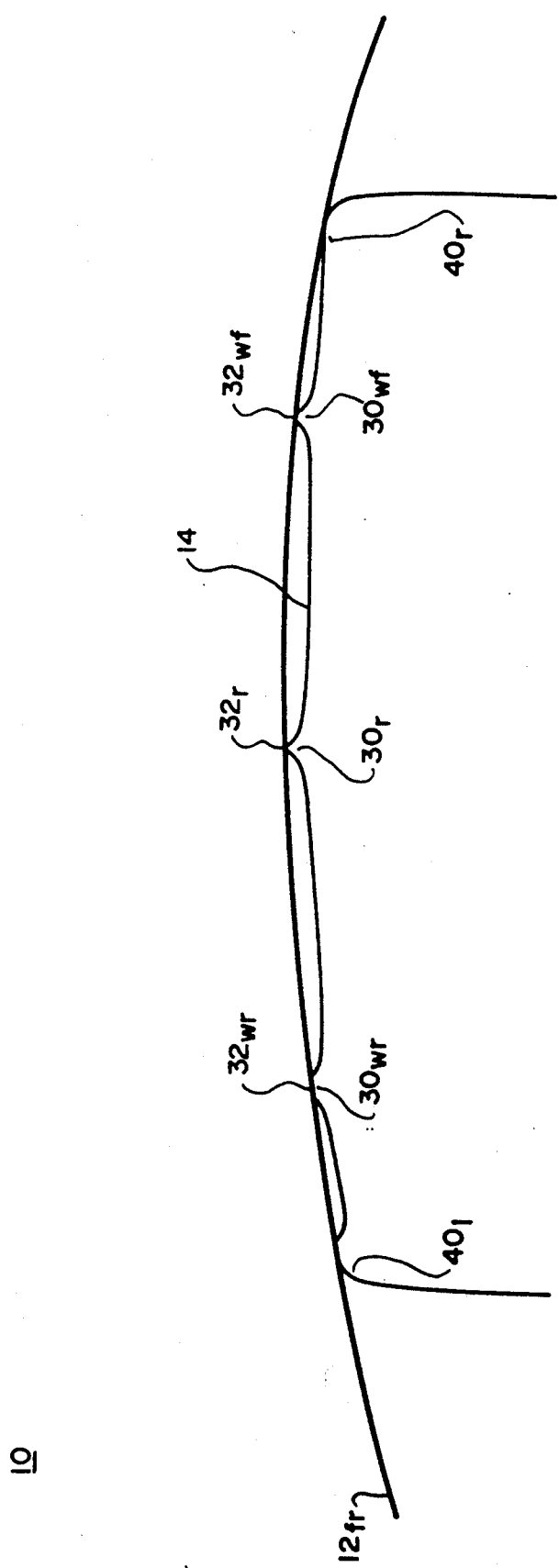
FIG. 1 is a cross-sectional diagram of a magnetic head assembly including read and write islands.

Referring to FIG. 1, a magnetic contact head assembly 10, arranged for data storage and retrieval operations on a magnetic tape 12, comprises a plurality of separate retrieving and recording elements or islands, generally designated at 30. The islands 30 include a read island $30_r$ flanked by two (2) write islands, i.e. a forward write island $30_{wf}$ and a reverse write island $30_{wr}$, both of which are preferably spaced 0.3 inch from the read island $30_r$. The recording head assembly 10 is preferably an inductive recording head with a generally arcuate outer surface 14 over which a fast-moving tape 12 passes. The read and write islands 30 are integral with the head assembly 10 and project above the outer surface 14.

Two (2) Outrigger islands $40_1$, $40_r$, typically located 0.165 inches from the write islands $30_w$, are also included in the head assembly 10. The outriggers 40 provide a proper approach angle for the magnetic tape 12 as it passes over the islands $30_w$. The "wrap" around the outrigger islands 40 is preferably between 2.25° and 2.75° at the islands 30. This provides improved tension and flutter control. The outriggers 40 also provide a cleaning action by removing debris from the surface of the tape 12. The outriggers 40 are preferably substantially identical in size and contour with the islands 30.

The magnetic tape 12, which may be either a thick tape $12_r$ or a thin tape $12_f$, typically resides in a cartridge consisting of a single reel of tape in a machine-accessible container (not shown). The container provides tape protection and a reduction in the need for human intervention in loading and unloading the tape. The magnetic tape 12 passes around guide rollers (not shown) and moves under tension over the magnetic head assembly 10.

Figure 2:
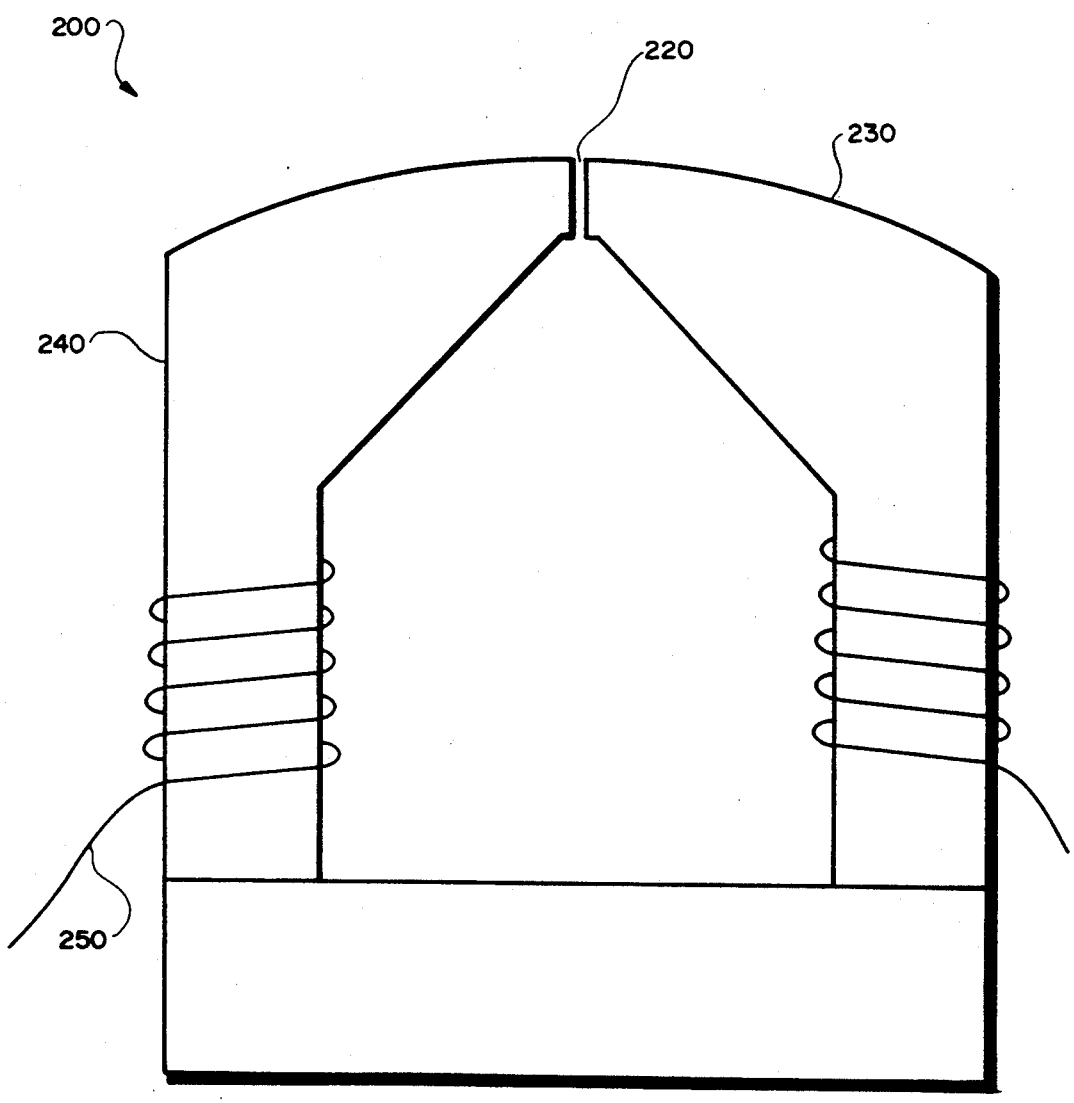
FIG. 2 is a cross-sectional diagram of a magnetic core of an island of a prior art head assembly.

FIG. 2 is a simplified diagram of a magnetic core of an island 200 of a conventional prior art head assembly. The island 200 consists of a magnetic coil 250 and a magnetic core 240 With a gap 220. The gap 220 is typically located in the center of the island 200 where "contact" with the tape is concentrated. When operating with a thin tape, the outer surface 230 of the island 200 is shaped to the natural curvature of the thin tape. Thereafter, when using a thick tape, movement over the head assembly gradually conforms the contour of the head to the natural curvature of the thick tape. Thus, the head experiences wear, with the largest degradation occurring at the maximum pressure point of the island 200, i.e. the center. Accordingly, when subsequently operating a thin tape on a head partially worn by a thick tape, an increased spacing loss occurs at the gap 220, which significantly reduces the amplitude of recorded/retrieved signals.

Figure 3:
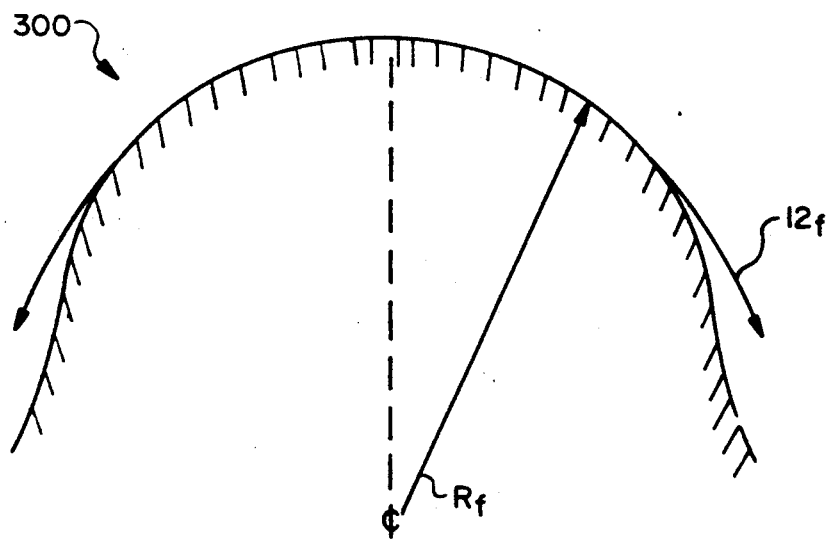
FIG. 3 is a diagram of a cross-section of an island used in the head assembly of the FIG. 1 and having a contour conforming to a thin tape and shown prior to operation with a thick tape.
Figure 4:
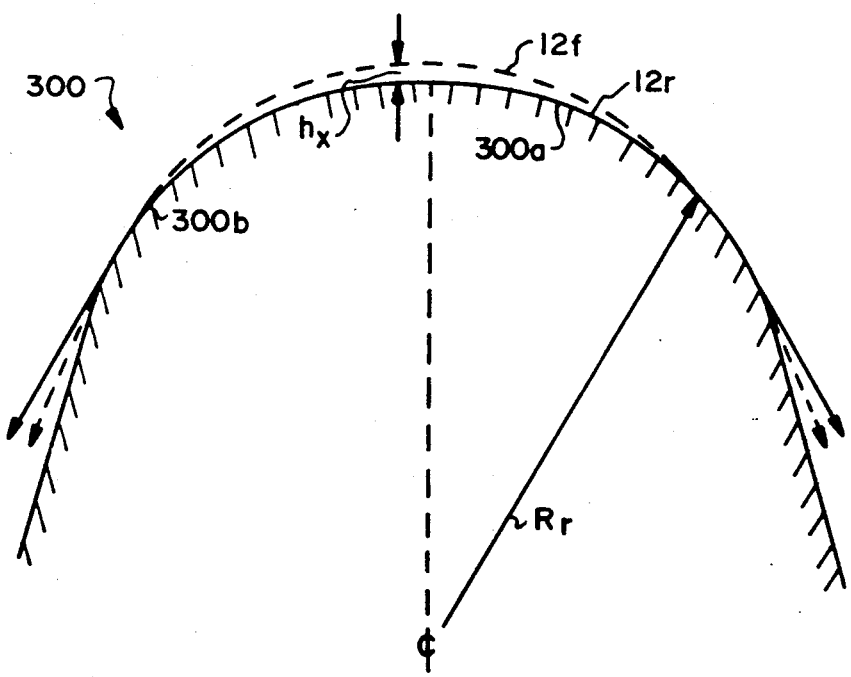
FIG. 4 is a diagram of the island of FIG. 3 after wear by the thick tape and showing the separation between the island and a thin tape.

This phenomenon will be better understood by reference to FIGS. 3 and 4. FIG. 3 is a diagram of an island 300 manufactured with a radius of curvature, Rf, of the thin tape $12_f$. As shown, the tape $12_f$ closely follows the curved surface of the island 300 depicted therein. However, operation with a thick tape $12_r$, which has a greater natural radius (Rr), gradually abrades the island to that radius. Since abrasion takes place over the area of contact, it begins at the top of the island and works downward. The top surface of the island 300 thus acquires the larger radius and the width of this top surface increases as wear by the thick tape $12_r$ progresses. This results in an increase in the tape-head separation when the thin tape $12_f$ is used.

More specifically, in FIG. 4, abrasion by a thick tape $12_r$ has worn down the island 300 near its center, with a resulting top surface 300a having a radius of curvature corresponding to the natural radius of the thick tape. Intermediate surfaces 300b still have the original radius of curvature. Consequently, when the thin tape $12_f$ is passed over the island 300, it cannot bend around the intersections of the surface 300a with the surfaces 300b; instead, it follows the path shown with the dashed line. Therefore, for a center-gap head island, the separation $h_x$ has materially increased for the thin tape with a consequent loss of signal strength.

Figure 5:
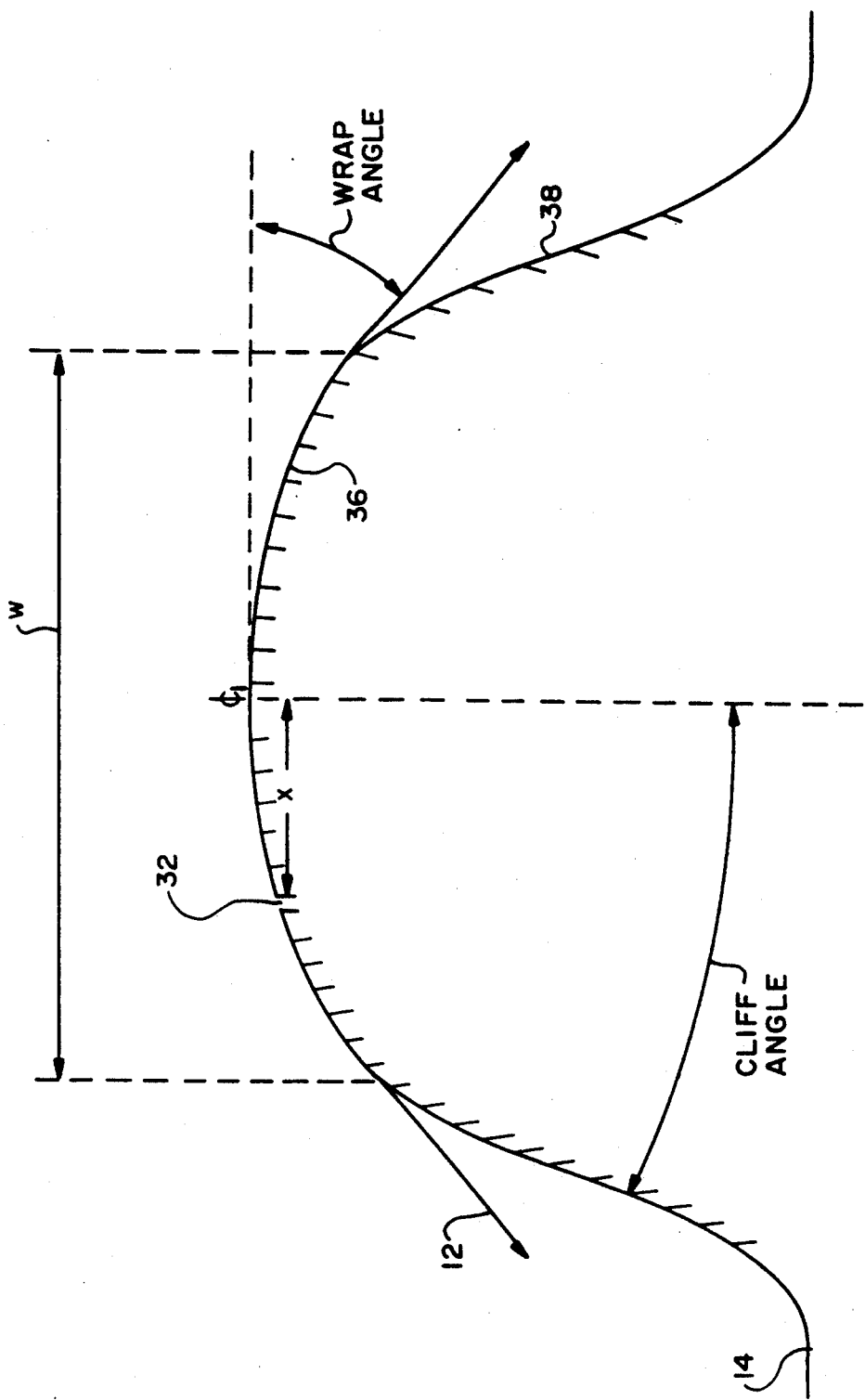
FIG. 5 is a diagram of an island of FIG. 1 showing the offset of the gap in accordance with the invention.

The present invention minimizes the spacing loss resulting from the above-described wear by offsetting the gaps 32 in the read and write islands 30 from the centers of the islands 30. FIG. 5 is a diagram of an island 30 of head assembly 10. The island 30 has a generally arcuate top surface 36 that is spaced from the head assembly outer surface 14 and that peaks at the geometric center $c_1$ of the top surface 36. The width w of the island 30 is approximately nine (9) mils (0.009 inch). The island 30 has sides 38 that extend between the head assembly outer surface 14 and the island top surface 36. The tape 12 is pulled across the island 30 at a tension of approximately 4 oz and at a wrap angle of 2.5°. A 45° "cliff" angle on the side 38 of island 30 determines the increase in width of the island 30 as the surface wears as a result of abrasion by the tape 12.

Figure 6:
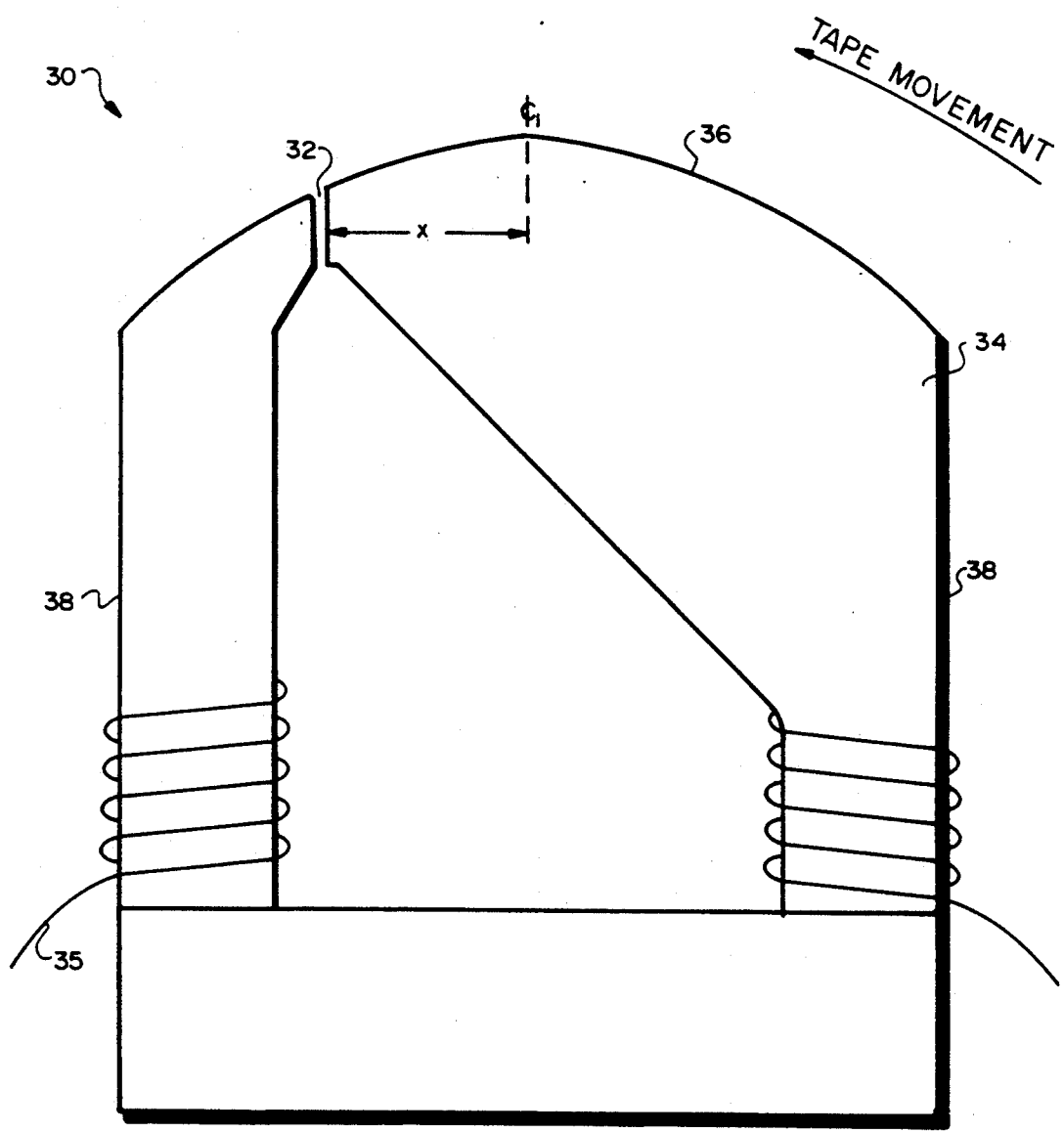
FIG. 6 is a cross-sectional diagram of a magnetic core of an island in accordance with the invention.

FIG. 6 is a simplified diagram of a magnetic core of an island 30 in accordance with the invention. The island 30 includes a magnetic coil 35 and a magnetic core 34 with a gap 32. The gap 32 of the island 30 is positioned a distance x from the geometric center $c_1$ of the top surface 36 of the island 30. The gap 32 is preferably offset in the direction of tape movement to minimize tape lifting. However, since the head assembly 10 facilitates retrieval and recording of data in either direction, the gap 32 can be shifted in the opposite direction and reliably perform read and write operations with tapes of different thicknesses. The exact location of the gap 32 depends upon the operating conditions of the tape drive system, i.e tension, wrap angle, speed, thickness and materials of the tape.

Generally, the gap 32 is offset as far as possible toward a side of the island so that the high density, thin tape "contacts" the gap 32. More specifically, the gap is offset from the center of the island 30 to a location that avoids unstable contact between the gap 32 and a moving thin tape $12_f$ on account of the "entrance effect". That is, as the tape $12_f$ approaches the side 38 of the island 30 and initially contacts its top surface 36, air is trapped between the moving tape and the surface. This causes flapping of the tape and unstable contact at the edge of the island 30. Additionally, the gap 32 is offset to a location that maintains controlled, i.e. narrow, separation between the gap 32 and a thick tape $12_r$.

Figure 7:
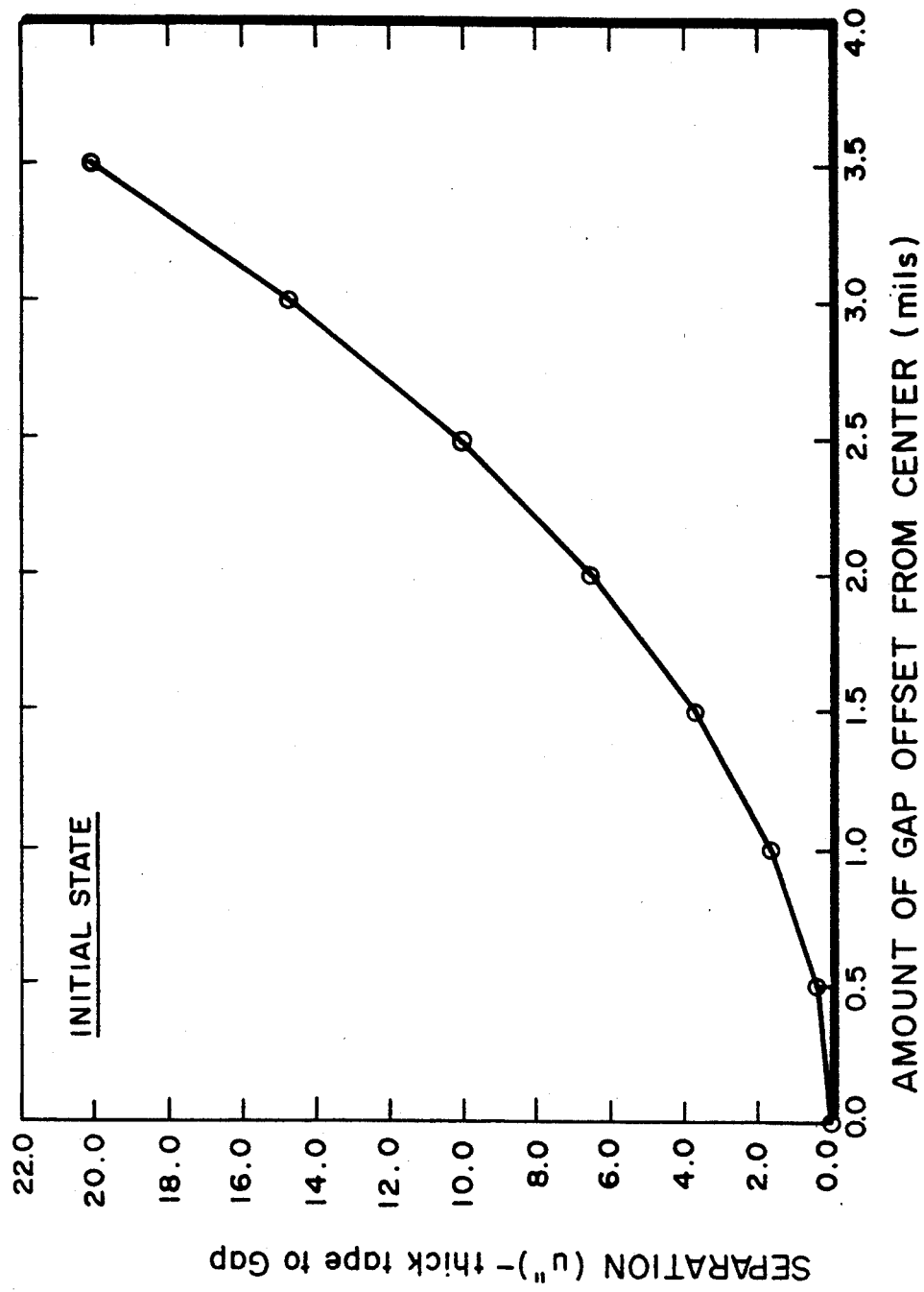
FIG. 7 is a graph illustrating the initial state of the relationship between the gap offset distance and the separation between a thick tape and the offset gap.

Thus, in a preferred embodiment of the invention, the gap offset distance x is approximately 2.5 mils (0.0025 inch) from the center $c_1$ of a 9.0 mil-wide island 30 or, a distance of approximately 55% from the center $C_1$ to the head assembly outer surface 14. The graph of FIG. 7 illustrates the initial state of the relationship between the gap offset distance and the resultant separation between the thick tape $12_r$ and the gap 32 for an island having a contour shaped to the thin tape $12_f$. As can be seen from the graph, a tape-head separation of 10 microinches occurs at the gap 32 when the gap is offset 2.5 mils from the center of the island 30. The 10 microinches of separation is within the acceptable range for low-density signal reproduction.

Figure 8:
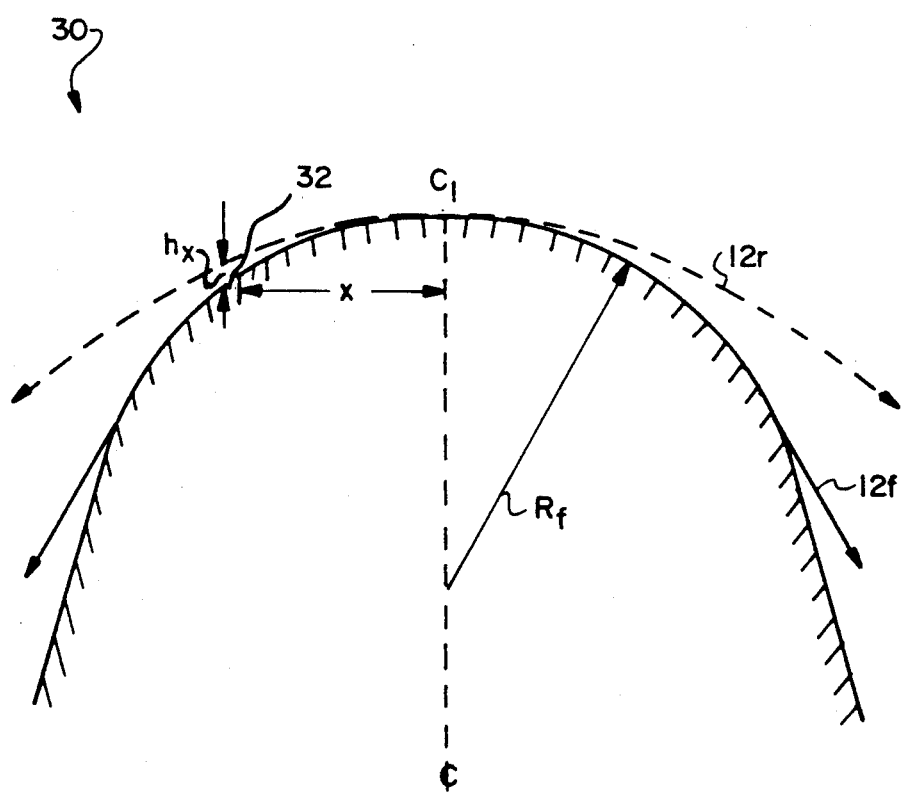
FIG. 8 is a diagram of the initial state of the island of FIG. 5 having a contour conforming to a thin tape and showing the separation between the offset gap and a thick tape.

FIG. 8 depicts the initial state of an island 30 with an offset gap 32. The thin tape $12_f$ contacts the gap 32 in a stable manner, since the surface of the island 30 conforms to the natural radius of the thin tape $12_f$. Contact between the tape $12_f$ and gap 32 is important because of the high density, and thus closely-spaced, signals recorded on the tape $12_f$.

On the other hand, the thick tape $12_r$, being substantially stiffer than the thin tape $12_f$, contacts the island 30 near its center $c_1$, but avoids contact with the offset gap 32. The resulting separation $h_x$ between the tape and gap 32 is significant, e.g. 10-20 microinches, yet sufficient to maintain proper signal performance, i.e. tolerable signal loss, with the low density, thick tape $12_r$. In other words, proper recording/retrieval performance can be maintained at an increased separation distance if the signal recording density is reduced proportionately.

As the operating time of the thick tape $12_r$ increases, the area of the island 30 that is contoured by the thick tape $12_r$ also increases. The maximum allowable time for thick tape operation is limited to the time it takes for the intersection of the radii of the thin and thick tapes to approach the gap 32. The embodiment disclosed herein provides a satisfactory period of time, e.g. at least 100 hours, for continuous operation of the thick tape $12_r$. However, subsequent operation of the thick tape $12_r$ tends to counteract the contour effects of the thick tape $12_r$ and eventually restores the island to its initial state.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A contact recording head assembly capable of performing reliable read and write data operations on magnetic tapes of varying thickness, said head assembly having a generally arcuate outer surface adjacent to which the tapes pass, said head assembly comprising:
   an island integral with said head assembly and projecting above said head assembly outer surface, said island having a generally arcuate top surface spaced from said head assembly outer surface and having an apex located at the geometric center of said top surface, said island further having island sides that extend between said head assembly outer surface and said island top surface, said island including a magnetic coil and a magnetic core with a gap,
   wherein said gap is located a distance of approximately 55% from said apex of said top surface to said head assembly outer surface, so as to maintain signal integrity when recording and reproducing data signals retrieved from the tapes.

2. The contact recording head assembly of claim 1 wherein said island is one of a read island and a write island.

3. The contact recording head assembly of claim 2 wherein the location of said gap away from said apex is in the direction of tape movement across said head assembly.

4. The contact recording head assembly of claim 3 wherein said predetermined distance is 2.5 mils from the center of a 9.0 mil wide island.

5. An inductive contact recording head assembly capable of performing reliable read and write data operations on magnetic tapes of varying thicknesses, said head assembly having a generally arcuate outer surface adjacent to which the tapes pass, said head assembly comprising:
   a read island integral with said head assembly and projecting above said head assembly outer surface, said read island having a generally arcuate top surface spaced from said head assembly outer surface and having an apex located at the geometric center of said top surface, said read island further having island sides that extend between said head assembly outer surface and said island top surface, said read island including a magnetic coil and a magnetic core with a gap; and
   a write island integral with said head assembly, said write island projecting above said head assembly outer surface and having a generally arcuate top surface spaced from said head assembly outer surface and peaking at the geometric centers of said top surface, said write island further having island sides that extend between said head assembly outer surface and said island top surface, said write island including a magnetic coil and magnetic core with a gap,
   wherein each of said gaps of said read and write islands is positioned a distance of approximately 55% from said apex of said top surface to said head assembly outer surface so as to maintain signal integrity when recording and reproducing data signals retrieved form the tapes.

6. The contact recording head assembly of claim 5 wherein the location of said gap away from said apex is in the direction of tape movement across said head assembly.

7. A contact recording head assembly capable of performing reliable read and write data operations on magnetic tapes of varying thickness, said head assembly having a generally arcuate outer surface adjacent to which the tapes pass, said head assembly comprising:
   a read island integral with said head assembly and projecting above said head assembly outer surface, said read island having a generally arcuate top surface spaced form said head assembly outer surface and having an apex located at the geometric center of said top surface, said read island further having island sides that extend between said head assembly outer surface and said island top surface, said read island including a magnetic coil and a magnetic core with a gap; and
   a plurality of write islands flanking said read island and integral with said head assembly, said write islands projecting above said head assembly outer surface and having generally arcuate top surfaces spaced from said head assembly outer surface and peaking at the geometric centers of said top surfaces, said write islands further having island sides that extend between said head assembly outer surface and said islands top surfaces, said write islands including magnetic coils and magnetic cores with gaps,
wherein said gaps of said read and write islands are positioned a distance of approximately 55% between the intersection of one of said islands sides and said islands top surfaces, and said apex of said top surfaces so as to maintain signal integrity when recording and reproducing data signals retrieved from the tapes.

* * * * *